Patented Feb. 22, 1938

2,108,807

UNITED STATES PATENT OFFICE 2,108,807

TRANSPARENT MATERIAL AND METHOD OF MAKING SAME

Theron G. Finzel and Donald E. Drew, Kenmore, N. Y., assignors, by mesne assignments, to E. I. du Pont de Nemours & Company, Wilmington, Del., a corporation of Delaware No Drawing. Application June 26, 1934, Serial No. 732,441

20 Claims. (Cl. 91—68)

This invention relates to transparent and, preferably also, moistureproof materials and to the method of making the same.

In copending application, Serial No. 717,938, filed March 29, 1934, there is disclosed a transparent and, preferably also, moistureproof paper which is produced inter alia by impregnating the paper, preferably after super-calendering, with a composition which simultaneously moistureproofs and transparentizes the paper. The transparentizing and moistureproofing composition includes inter alia a cellulose derivative and is characterized by the fact that the solid ingredients thereof, when subjected to an elevated temperature, and containing solvents to the extent of 10% or less by weight, possess the property of softening and flowing. The cellulose derivatives used in these compositions are of the relatively low-viscosity type.

It is well known that a cellulose derivative possessing a higher viscosity (20 to 100 seconds) will give a tougher, more elastic and more durable film when compounded with other ingredients into a lacquer than a relatively low-viscosity cellulose derivative compounded into a similar lacquer. Such a higher viscosity cellulose derivative, however, is not satisfactory when formulated with other substances as a lacquer for the purpose of impregnating paper in order to transparentize the same.

We have found that by impregnating thin super-calendered porous paper, preferably also containing a wetting agent, with a lacquer free of cellulose derivative and comprising a resin, with or without a plasticizer, with or without a cellulose softener, there will be produced a highly transparent material which, when dried, will be substantially free from spots or white haze. In some instances, the paper so treated has an undesirable tacky surface, whereby the use of the material is restricted. To overcome this and provide a product which is capable of more widespread use, there is applied a surface coating which is transparent, non-tacky and possesses the desired surface slip. When a transparent paper, which is also moistureproofed, is desired, this may be secured by incorporating a moistureproofing wax or waxy substance in either the transparentizing composition or surface coating.

It is, therefore, an object of this invention to provide a transparent and preferably also moistureproof paper.

Another object of this invention is to provide a highly calendered paper, preferably of the thin porous type and containing a wetting agent, impregnated with a composition free of cellulose derivatives and comprising a resin in proportions which transparentizes said paper, said transparentized paper being provided preferably also with a transparent, glossy, non-tacky surface coating, the transparentizing composition or surface coating preferably also containing a moistureproofing wax or waxy substance, whereby a moistureproof product is obtained.

Another object of this invention is to provide a method of making transparent and preferably also moistureproof paper.

Other objects will become apparent from the following description and appended claims.

For the purposes of this specification and claims, we define moistureproof materials as those which, in the form of continuous, unbroken sheets or films, permit the passage of not more than 690 grams of water vapor per 100 square meters per hour, over a period of 24 hours, at approximately 39.5° C.±0.5° C., the relative humidity of the atmosphere at one side of the film being maintained at least at 98% and the relative humidity of the atmosphere at the other side being maintained at such a value as to give a humidity differential of at least 95%.

Moistureproofing coating compositions are defined as those which, when laid down in the form of a thin, continuous, unbroken film applied uniformly as a coating with a total coating thickness not exceeding 0.0005" to both sides of a sheet of regenerated cellulose of thickness approximately 0.0009", will produce a coated product which is moistureproof.

For the purposes of experimental tests, especially for those materials adaptable as coating compositions, moistureproof materials include those substances, compounds or compositions which, when laid down in the form of a continuous, unbroken film applied uniformly as a coating with a total coating thickness not exceeding 0.0005" to both sides of a sheet of regenerated cellulose of thickness approximately 0.0009", will produce a coated sheet which will permit the passage therethrough of not more than 690 grams of water vapor per 100 square meters per hour over a period of approximately 24 hours, at a temperature of 39.5° C.±0.5° C. (preferably 39.5° C.±0.25° C.), with a water vapor pressure differential of 50–55 mm. (preferably 53.4±0.7 mm.) of mercury. For convenience, the number of grams of water vapor passed under these conditions may be referred to as "the permeability value". An uncoated sheet of regenerated cellulose having a thickness of approximately 0.0009" will show a permeability value of the order of 6900.

From the foregoing, it is apparent that under the conditions set forth, a moistureproofed regenerated cellulose sheet is capable of resisting the passage of moisture or water vapor therethrough at least ten times as effectively as the uncoated regenerated cellulose sheet.

In accordance with the principles of the instant invention, paper of the type more fully explained hereafter is super-calendered and then impregnated with a liquid composition free of cellulose derivatives and comprising essentially a resin, as will also hereafter be more fully explained. After impregnation, the excess solution is removed in any suitable manner, and the impregnated sheet is subjected to an elevated temperature, such as 75° C. to 90° C. The paper at this stage is free from any objectionable white haze and is characterized by a high light transmission. It is, however, characterized in that it is slightly tacky, especially if warm, whereby the use thereof is restricted. To overcome this undesirable feature and make the material capable of a more widespread use, the transparentized paper is provided with a surface coating which is transparent, non-tacky and possesses good surface slip.

In the preferred embodiment of the invention, the paper, prior to super-calendering, is impregnated with a wetting agent, such as more fully explained in copending application, Serial No. 732,440, filed June 26, 1934. The wetting agent aids in improving the transparency of the final transparent material.

The paper to be transparentized may or may not be semi-transparent. In the preferred embodiment of the invention, the porous type of tissue paper is utilized. Tissue paper is less transparent than glassine paper, but it is more porous and permits better penetration of liquids.

The resin composition contemplated by the instant invention is free of cellulose derivatives, and the ingredients thereof may consist of any one of the formulae hereafter set forth:

Resin—solvent;
Resin—plasticizer—solvent;
Resin—cellulose softener—solvent;
Resin—plasticizer—cellulose softener—solvent.

When the impregnating resin lacquer is to be of the type which, in addition to transparentizing, also moisture-proofs, then a moisture proofing wax or waxy substance is included in the aforementioned formulae.

The resin or gum in the impregnating lacquer may be either natural or synthetic. Such resins may include rosin or hydrogenated rosin, the rosin ester of glycerol, glycol or diethylene glycol, the alkyd resins, either modified with oils or unmodified, shellac, coumarone resins, gum thus, gum dammar, gum dammar residue, or any of the common resins or resin-like substances. By gum dammar residue, we mean such a precipitate which is formed by adding ethyl alcohol to a toluene solution of gum dammar. This precipitate or residue is not compatible with pyroxylin and is a waste product in the manufacture of gum dammar-pyroxylin lacquers.

For the plasticizer, we use one or more of the compounds which have a plasticizing action on the resin. We prefer to use a plasticizer which is practically odorless. Such plasticizers may include ethyl metatoluene sulphonamide, dibutyl phthalate, tricresyl phosphate, triphenyl phosphate, castor oil, mineral oil or any other plasticizers depending upon the characteristics of the resin used. Such a plasticizer should be used to reduce the brittleness of the resin. In some cases it is desirable to add an additional amount of a plasticizer above that required by the resin alone to produce an extremely supple product. Any stickiness resulting from such an excess of plasticizer in the undercoat will be completely covered by the cellulose derivative or other suitable topcoat.

As a wax, we prefer to use a colorless high-melting paraffin wax, such as one having a melting point of 52° C., 55° C. or 60° C. or higher. However, other waxes may be used, such as ceresin, synthetic waxes, beeswax, spermaceti, candelilla wax, Brazil wax, or a mixture of several waxes which have moistureproofing action. It is preferable but not absolutely necessary to incorporate a wax in the impregnating resin lacquer. If, however, the wax is omitted in the impregnating lacquer, it will be necessary to include it in the cellulose derivative or other lacquer topcoat, to be subsequently applied to the resin-treated sheets if a moistureproof product is desired.

The purpose of the cellulose softener is to prevent the paper base from becoming brittle as it is subjected to a relatively high temperature during the drying of the coated sheet. The softening action of such a lacquer containing a cellulose softener is further described in a copending application, Serial No. 732,444, filed June 26, 1934. Such cellulose softeners include ethylene glycol, diethylene glycol and other glycols, triethanolamine, sulphonated vegetable oils, the glycol acetates and other water-soluble substances which are also soluble in the lacquer solvents and compatible at least to a degree with the lacquer solids.

As a solvent for the above-mentioned resin-impregnating composition, we may use any solvent or solvent mixture which will promote the compatibility of the lacquer ingredients and give to the lacquer a suitable evaporation rate in keeping with the qualities desired of the finished product. We have found that the use of a considerable portion of high-boiling solvents is desirable so that the impregnation of the paper with the resin lacquer may be carried out at a temperature preferably above 50° C. and up to the boiling point of the lowest boiling solvent. Through the use of such high lacquer bath temperatures, we have found that the air entrapped within and between the fibers and also the moisture held by the fibers are greatly eliminated, resulting in better penetration of the lacquer. It is necessary to hold the lacquer bath temperature above the crystallizing point of the wax in the lacquer. It is, however, not absolutely necessary to use a high boiling solvent to impregnate the paper at a temperature above 50° C. If a lower boiling solvent and a lower temperature of impregnation are used, the time of impregnation must be increased accordingly.

Solvents for resin impregnation solutions are not necessary if the composition is not too viscous for good impregnation, when molten and when the melt can be maintained at a sufficiently low temperature so that the paper is not harmed.

Satisfactory results are secured by using 5 to 50 pounds of resin solids for 100 pounds of paper and, when a topcoat is provided, 2 to 20 pounds of topcoat lacquer solids for 100 pounds of resin-impregnated paper.

Hereafter are set forth several specific illustrative examples of resin lacquers contemplated by the instant invention, the percentages being by weight:

Example I

| Solids | Percent |
|---|---|
| Ester gum | 80.0 |
| Paraffin wax | 4.0 |
| Castor oil | 16.0 |
| | 100.0 |

| Solvent | Percent |
|---|---|
| Toluene | 100.0 |

Solids content _____ 23.8

Example II

| Solids | Percent |
|---|---|
| Ester gum | 70.2 |
| Paraffin | 1.7 |
| Castor oil | 7.0 |
| Ethyl metatoluene sulphonamide | 21.1 |
| | 100.0 |

| Solvent | Percent |
|---|---|
| Toluene | 100.0 |

Solids content _____ 23.0–27.0

Example III

| Solids | Percent |
|---|---|
| Ester gum | 80.0 |
| Paraffin | 2.0 |
| Triethylene glycol | 18.0 |
| | 100.0 |

| Solvent | Percent |
|---|---|
| Toluene | 100.0 |

Solids content _____ 23.8

Example IV

| (a) Solids | Percent |
|---|---|
| Diethylene glycol abietate | 90.9 |
| Paraffin | 9.1 |
| | 100.0 |

| Solvent | Percent |
|---|---|
| Toluene | 100.0 |

Solids content _____ 21.6

(b) Solvent in (a) omitted and used in molten state.

Example V

| (a) Solids | Percent |
|---|---|
| Coumarone resin (melting point 83° C.) | 81.5 |
| Paraffin | 2.1 |
| Ethyl metatoluene sulphonamide | 16.4 |
| | 100.0 |

| Solvent | Percent |
|---|---|
| Toluene | 100.0 |

Solids content _____ 23.4

(b) Solvent in (a) omitted and used in the molten state.

Example VI

| Solids | Percent |
|---|---|
| Coumarone resin (melting point 83° C.) | 81.5 |
| Paraffin | 2.1 |
| Ethyl metatoluene sulphonamide | 8.2 |
| Triethylene glycol | 8.2 |
| | 100.0 |

| Solvent | Percent |
|---|---|
| Toluene | 100.0 |

Solids content _____ 23.4

Example VII

| Solids | Percent |
|---|---|
| Coumarone resin (melting point 83° C.) | 88.8 |
| Paraffin | 2.2 |
| Ethyl metatoluene sulphonamide | 9.0 |
| | 100.0 |

| Solvent | Percent |
|---|---|
| Toluene | 100.0 |

Solids content _____ 22.0

Example VIII

| Solids | Percent |
|---|---|
| Dewaxed shellac | 85.5 |
| Tricresyl phosphate | 14.5 |
| | 100.0 |

| Solvent | Percent |
|---|---|
| Methyl alcohol | 31.7 |
| Ethyl acetate | 34.15 |
| Monobutyl ether of ethylene glycol | 34.15 |
| | 100.0 |

Solids content _____ 15.0–22.0

Example IX

| Solids | Percent |
|---|---|
| Dewaxed shellac | 100.0 |

| Solvent | Percent |
|---|---|
| Methyl alcohol | 31.7 |
| Ethyl acetate | 34.15 |
| Butyl ether of ethylene glycol | 34.15 |
| | 100.0 |

Solids content _____ 19.9

Example X

| Solids | Percent |
|---|---|
| Shellac | 81.5 |
| Diethylene glycol | 18.5 |
| | 100.0 |

| Solvent | Percent |
|---|---|
| Methyl alcohol | 21.9 |
| Ethyl acetate | 39.05 |
| Monobutyl ether of ethylene glycol | 39.05 |
| | 100.00 |

Solids content _____ 17.4

Example XI

| Solids | Percent |
|---|---|
| Dewaxed shellac | 83.3 |
| Ethyl metatoluene sulphonamide | 7.1 |
| Diethylene glycol | 9.6 |
| | 100.0 |

| Solvent | Percent |
|---|---|
| Ethyl acetate | 39.0 |
| Monobutyl ether of ethylene glycol | 39.1 |
| Methyl alcohol | 21.9 |
| | 100.0 |

Solids content _____ 17.1

The method of applying the resin-impregnating lacquer consists preferably in passing the sheet through the lacquer bath and removing the excess by means of doctor knives or rolls or other suitable means. The sheets may be impregnated by any other method, such as passing between rolls over which the lacquer in question flows. The lacquer-impregnated sheet is preferably force-dried with warm air, but it is desirable not to have the air temperature above 110° C. The best results are obtained when the drying temperature is above the melting point of the wax and at such a temperature at which substantially all of the solvents are eliminated from the sheet and the resin composition has become sufficiently soft to insure uniform impregnation of the paper base. If the resin in the impregnating lacquer has been modified with a drying oil, it is desirable to allow the undercoat to age and absorb oxygen before applying the topcoat. However, this is not absolutely necessary, as the top coat may be applied directly to the sheet which has been freed of solvents. The impregnating resin lacquer may be applied and dried, and preferably directly followed by the application and drying of the topcoat lacquer in one operation without an intervening wind-up of the resin-treated paper. On the other hand, if it is desired to split the process into two operations, it is possible to do so. The resin-impregnated paper should be cooled by air blasts or other suitable means as it emerges from the first drier and before it is coated with the topcoat. It is also necessary to provide such cooling if the resin-treated paper is to be wound into roll form, as the resin-treated sheet is invariably sticky while warm.

The resin-treated sheet is from approximately 0.0002" to 0.0003" thicker than the original untreated paper. It is transparent, free from any milky-white haze, and, if the wax has been incorporated, it is moistureproof. The resin-impregnated sheets, however, possess a poor surface, i. e. two such resin-treated sheets will not slip over each other to the desired degree. The resin-impregnated sheets will become tacky when slightly warm, for instance, at the body temperature, and will stick to each other when stacked upon each other and held in storage for some time. To correct these surface imperfections, the topcoat is applied. The total thickness of the topcoat (both sides) is from approximately 0.00005" to 0.0006".

The composition for topcoating may consist of any of the following formulae:
Cellulose derivative—solvent;
Cellulose derivative—resin—solvent;
Cellulose derivative—plasticizer—solvent;
Cellulose derivative—resin—plasticizer—solvent;
Resin—solvent;
Resin—plasticizer—solvent.

The topcoating formulae immediately hereinbefore set forth are to be used when the transparentizing lacquer also includes a moistureproofing ingredient. However, when the transparentizing resin lacquer does not include a wax and a moistureproof material is desired, then a wax or other moistureproofing ingredient will be incorporated in the topcoat lacquer.

The cellulose derivative may be an ether or an ester of cellulose or a mixed ester. Ethyl cellulose, cellulose nitrate, cellulose acetate, cellulose aceto-nitrate or cellulose propionate or other cellulose derivatives may be used. Either low or moderately low-viscosity cellulose derivatives may be used. However, in most cases, it is desirable to avoid the use of exceptionally low-viscosity cellulose derivatives. Alcohol-soluble nitrocotton (a low-viscosity nitrocotton) has proved very useful for application over some resin-treated papers in which the resin proved to be too soluble in the regular cellulose nitrate solvents, such as ethyl acetate, butyl acetate, etc.

If a resin is used in the topcoat lacquer, it may be either natural or synthetic. Rosin, hydrogenated rosin, esters of hydrogenated rosin, rosin esters of glycol, diethylene glycol or glycerol, gum dammar, gum thus, shellac, or the glyptals, either modified with oil or unmodified, are illustrative examples which may be used. When the topcoating composition contains a cellulose derivative, we may use any resin which is compatible with the cellulose derivative in question. It is also possible to use a resin alone in the topcoat, providing that resin will remove the tackiness of the undercoat and produce a glossy, flexible product. Such resins include shellac, polymerized vinyl acetate, polymerized chlorvinyl acetate, or resins of the polyvinyl acetal type. These resins produce a dry-feeling surface.

For the plasticizer, any of the compounds having a flexibilizing action on the solids of the topcoat may be used. We prefer to use a plasticizer which is practically odorless. Excellent results have been obtained through the use of tricresyl phosphate, triphenyl phosphate, dibutyl phthalate, diamyl phthalate, ethyl metatoluene sulphonamide or castor oil. In many cases it is not necessary to use any plasticizer at all. In such cases, either a soft resin may be incorporated in the topcoat lacquer, or the resin-impregnating lacquer first applied as an undercoat to the base may have been over-plasticized to such an extent that the cellulose derivative subsequently applied absorbs all the plasticizer necessary from the over-plasticized resin with which the paper was first treated.

If no wax was used in the resin-impregnating lacquer, a wax must be incorporated in the topcoat lacquer to produce a moistureproof product. For such a wax we prefer to use a paraffin wax having a high melting point. However, we may use any wax which will moistureproof the product, such as, for example, beeswax, candelilla wax, Brazil wax, palm wax, etc.

The solvents in the topcoat lacquer may consist of any of the common cellulose derivative lacquer solvents or mixtures thereof, with or without the addition of suitable diluents, such as toluol, naphtha or petroleum hydrocarbons, or partial cellulose derivative solvents, such as ethyl, butyl or amyl alcohol, or the higher alcohols. The solvent mixture is adjusted so as to promote compatibility of the lacquer ingredients at all stages of the drying of the lacquer. It is desirable to use solvents in the topcoat which do not appreciably dissolve the resin or paraffin in the undercoat. However, we may use a topcoating composition, the solvents of which would attack the undercoat if left in contact with the undercoat for any length of time. Such a topcoat is applied in a suitable manner, which is by spraying or by rapidly applying a uniform quantity of lacquer to each surface of the film from two hoppers, one on each side of the film, and quickly drying the topcoat lacquer. In the latter case, the lacquer issues from suitably designed hopper lips which are in contact with both surfaces of the resin-treated film. Immersing the resin-treated sheet in the topcoat lacquer or any other method of laying or depositing a thin coat of topcoat lacquer on the resin-treated sheet and then rapidly drying this topcoat lacquer is suitable.

The drying of the topcoat is carried out preferably with warm air but the air temperature should not be over 110° C. If the topcoat contains a wax, the temperature of the air in the drying compartment should be above the melting point of the wax to give best results. If, on the other hand, the topcoat contains no wax, it may be dried at a lower temperature, even as low as room temperature, and still produce a product free from spots or haze and which is transparent and moistureproof. Under optimum conditions, the solvents of the topcoat should be evaporated under such conditions that no incompatibility of lacquer ingredients exists at any time during the drying operation.

After drying, it is desirable but not necessary to subject the coated sheet to a humidified atmosphere for such a time and preferably above 40° C. to incorporate an amount of moisture within the sheet equivalent to that of an air-dry condition of the product.

As illustrative of several embodiments of topcoating lacquers, the following are given, the percentages being by weight:

*Example XII*

| Solids | Percent |
|---|---|
| Ethyl cellulose (high viscosity) | 83.3 |
| Ethyl metatoluene sulphonamide | 16.7 |
| | 100.0 |

| Solvent | Percent |
|---|---|
| Ethyl alcohol | 90.0 |
| Acetone | 10.0 |
| | 100.0 |

Solids content _____ 7.4

*Example XIII*

| Solids | Percent |
|---|---|
| Ethyl cellulose (high viscosity) | 54.0 |
| Ethyl metatoluene sulphonamide | 13.5 |
| Rosin | 32.5 |
| | 100.0 |

| Solvent | Percent |
|---|---|
| Ethyl alcohol | 90.0 |
| Acetone | 10.0 |
| | 100.0 |

Solids content _____ 11.0

*Example XIV*

| Solids | Percent |
|---|---|
| Alcohol-soluble nitrocotton | 71.4 |
| Ethyl metatoluene sulphonamide | 21.5 |
| Castor oil | 7.1 |
| | 100.0 |

| Solvent | Percent |
|---|---|
| Ethyl alcohol | 83.0 |
| Acetone | 8.8 |
| Monobutyl ether of ethylene glycol | 8.2 |
| | 100.0 |

Solids content _____ 16.1

*Example XV*

| Solids | Percent |
|---|---|
| Alcohol-soluble nitrocotton | 50.0 |
| Rosin | 30.0 |
| Ethyl metatoluene sulphonamide | 10.0 |
| Castor oil | 10.0 |
| | 100.0 |

| Solvent | Percent |
|---|---|
| Ethyl alcohol | 83.0 |
| Acetone | 8.8 |
| Monobutyl ether of ethylene glycol | 8.2 |
| | 100.0 |

Solids content _____ 16.0

*Example XVI*

| Solids | Percent |
|---|---|
| Ethyl cellulose (high viscosity) | 100.0 |

| Solvent | Percent |
|---|---|
| Ethyl alcohol | 90.0 |
| Acetone | 10.0 |
| | 100.0 |

Solids content _____ 3.0–5.0

*Example XVII*

| Solids | Percent |
|---|---|
| Ethyl cellulose (high viscosity) | 62.5 |
| Dewaxed shellac | 37.5 |
| | 100.0 |

| Solvent | Percent |
|---|---|
| Ethyl alcohol | 90.0 |
| Acetone | 10.0 |
| | 100.0 |

Solids content _____ 3.0–5.0

*Example XVIII*

| Solids | Percent |
|---|---|
| Ethyl cellulose | 80.0 |
| Paraffin | 4.0 |
| Ethyl metatoluene sulphonamide | 16.0 |
| | 100.0 |

| Solvent | Percent |
|---|---|
| Low flash naphtha | 92.5 |
| Ethyl acetate | 7.5 |
| | 100.0 |

Solids content _____ 6.0–9.0

*Example XIX*

| Solids | Percent |
|---|---|
| Ethyl cellulose | 44.5 |
| Ester gum | 44.5 |
| Paraffin | 2.2 |
| Ethyl metatoluene sulphonamide | 8.8 |
| | 100.0 |

| Solvent | Percent |
|---|---|
| Low flash naphtha | 92.5 |
| Ethyl acetate | 7.5 |
| | 100.0 |

Solids content _____ 6.0–14.5

In order to more clearly explain the invention, the following specific example, illustrating one complete embodiment of the invention, is set forth:

A thin, porous sulphite tissue 0.0005" to 0.0009" in thickness is treated with a 5% solution of ammonium oleate and dried until it feels distinctly damp. The damp paper is passed through a super-calender stack, the rolls of which are cooled. This is followed by another super-calendering operation in which hot rolls are used. If desired, these two calendering operations may be combined into one operation in which half the rolls are cold and half heated. The dry calendered paper is passed through a lacquer bath, held at a temperature preferably between 45° C. and 85° C. and having the following composition:

| Solids | Percent |
|---|---|
| Ester gum | 80.0 |
| Paraffin wax | 4.0 |
| Castor oil | 16.0 |
| | 100.0 |

| Solvent | Percent |
|---|---|
| Toluene | 100.0 |

| Solids content | 23.8 |
|---|---|

The time of immersion in the above resin lacquer bath should be 10 seconds or longer. The excess resin lacquer is scraped off by means of suitable doctor knives or other means and the impregnated sheet is passed through a heated drying chamber held at 75° C. to 90° C. The so-impregnated and dried sheet shows a high light transmission and is free from any objectionable white haze, but is slightly tacky, especially if warm. The film at this stage is 0.0007" to 0.0012" thick. Immediately after drying the above-impregnated sheet is cooled by means of a cold air blast and coated with a topcoat lacquer. The topcoat lacquer is applied by delivering a uniform quantity of lacquer to each surface of the film from two hoppers, one on each side of the film. The lacquer issues from suitably designed hopper lips which are in contact with both surfaces of the resin-treated film. The topcoating lacquer is held at 20° C. to 35° C. and consists of:

| Solids | Percent |
|---|---|
| Ethyl cellulose (high viscosity) | 83.3 |
| Ethyl metatoluene sulphonamide | 16.7 |
| | 100.0 |

| Solvent | |
|---|---|
| Ethyl alcohol | 90.0 |
| Acetone | 10.0 |
| | 100.0 |

| Solids content | 7.4 |
|---|---|

The film thus uniformly coated enters the second drying chamber held at 60° C. to 90° C. where the solvents of the topcoat are removed.

The dried film is passed through a humidifying chamber held at 40° C. to 60° C. and a relative humidity of 60% to 85%, in which operation moisture equivalent to an air-dry condition of the film is picked up. The film is finally wound on a suitable core. The thickness of the product may vary between the limits of 0.00075" to 0.0018".

The product produced will be flexible, free from white haze, will show good light transmission, and be moistureproof. Several of such films will slip very readily over each other, indicating that the surface coat has removed all stickiness inherent in the resin undercoat.

Since it is obvious that various changes and modifications may be made in the above description without departing from the nature or spirit thereof, this invention is not restricted thereto except as set forth in the appended claims.

We claim:

1. A highly calendered paper containing a wetting agent distributed throughout its mass and impregnated with a composition free of cellulose derivatives and comprising a resin in proportions which transparentizes said paper.

2. A highly calendered paper containing a wetting agent distributed throughout its mass and impregnated with a composition free of cellulose derivatives and consisting essentially of a resin and a wax in proportions which simultaneously transparentizes and moistureproofs said paper.

3. A highly calendered paper containing a wetting agent distributed throughout its mass and impregnated with a composition free of cellulose derivatives, comprising a resin in proportions which transparentizes said paper and having a transparent, non-tacky surface coating.

4. A highly calendered paper containing a wetting agent distributed throughout its mass and impregnated with a composition free of cellulose derivatives and consisting essentially of a resin and a wax in proportions which simultaneously transparentizes and moistureproofs said paper and having a transparent, non-tacky surface coating.

5. A highly calendered paper containing a wetting agent distributed throughout its mass and impregnated with a composition free of cellulose derivatives and comprising a resin in proportions which transparentizes said paper and having a moistureproof, transparent, non-tacky surface coating.

6. A highly calendered paper containing a wetting agent distributed throughout its mass and impregnated with a composition free of cellulose derivatives and consisting essentially of a resin and a wax in proportions which simultaneously transparentizes and moistureproofs said paper and having a moistureproof, transparent, non-tacky surface coating.

7. A highly calendered paper containing a wetting agent distributed throughout its mass and impregnated with a composition free of cellulose derivatives and comprising a resin which transparentizes said paper and is present in an amount of approximately 5 to 50 pounds per 100 pounds of paper.

8. A highly calendered paper containing a wetting agent distributed throughout its mass and impregnated with a composition free of cellulose derivatives and comprising a resin which transparentizes said paper and is present in an amount of approximately 5 to 50 pounds per 100 pounds of paper and having a transparent, non-tacky surface coating, the ingredients of which are present in an amount of approximately 2 to 20 pounds per 100 pounds of the resin-treated paper.

9. A highly calendered paper containing a wetting agent distributed throughout its mass and impregnated with a composition consisting essentially of dewaxed shellac, ethyl metatoluene sulphonamide and diethylene glycol in such relative proportions as to transparentize the paper.

10. A highly calendered paper containing a wetting agent distributed throughout its mass and impregnated with a composition consisting of 83.3% dewaxed shellac, 7.1% ethyl metatoluene sulphonamide, 9.6% diethylene glycol, the percentages being by weight, whereby the paper is transparentized.

11. A highly calendered paper containing a wetting agent distributed throughout its mass and impregnated with a composition consisting essentially of dewaxed shellac, ethyl metatoluene sulphonamide and diethylene glycol in such relative proportions as to transparentize the paper, the transparentized base having on each side thereof a surface coating formed of a composition consisting essentially of ethyl cellulose, paraffin and ethyl metatoluene sulphonamide in such proportions as to produce a transparent moistureproof coating.

12. A highly calendered paper containing a wetting agent distributed throughout its mass and impregnated with a composition consisting of 83.3% dewaxed shellac, 7.1% ethyl metatoluene sulphonamide and 9.6% diethylene glycol, whereby the paper is transparentized, the transparentized paper having on each side thereof a transparent moistureproof surface coating formed of a composition consisting of 80% ethyl cellulose, 4% paraffin and 16% ethyl metatoluene sulphonamide, the percentages being by weight.

13. A highly calendered paper containing a wetting agent distributed throughout its mass and impregnated with a composition consisting essentially of ester gum, paraffin, castor oil and ethyl metatoluene sulphonamide in such relative proportions as to simultaneously transparentize and moistureproof the paper.

14. A highly calendered paper containing a wetting agent distributed throughout its mass and impregnated with a composition consisting of 70.2% ester gum, 1.7% paraffin, 7.0% castor oil and 21.1% ethyl metatoluene sulphonamide, the percentages being by weight, whereby the paper is simultaneously transparentized and moistureproofed.

15. A highly calendered paper containing a wetting agent distributed throughout its mass and impregnated with a composition consisting essentially of ester gum, paraffin, castor oil and ethyl metatoluene sulphonamide in such relative proportions as to simultaneously transparentize and moistureproof the paper, the transparentized base having on each side thereof a transparent surface coating formed of a composition consisting essentially of alcohol-soluble nitrocotton, ethyl metatoluene sulphonamide and castor oil.

16. A highly calendered paper containing a wetting agent distributed throughout its mass and impregnated with a composition consisting of 70.2% ester gum, 1.7% paraffin, 7.0% castor oil and 21.1% ethyl metatoluene sulphonamide, whereby the paper is simultaneously moistureproofed and transparentized, the transparentized base having a transparent surface coating formed of a composition consisting of 71.4% alcohol-soluble nitrocotton, 21.5% ethyl metatoluene sulphonamide, 7.1% castor oil, the percentages being by weight.

17. A highly calendered paper containing a wetting agent distributed throughout its mass and impregnated with a composition consisting essentially of dewaxed shellac and tricresyl phosphate in such relative proportions as to transparentize the paper.

18. A highly calendered paper containing a wetting agent distributed throughout its mass and impregnated with a composition consisting of 85.5% dewaxed shellac, 14.5% tricresyl phosphate, the percentages being by weight, whereby the paper is transparentized.

19. A highly calendered paper containing a wetting agent distributed throughout its mass and impregnated with a composition consisting essentially of dewaxed shellac and tricresyl phosphate in such relative proportions as to transparentize the paper, the transparentized base having on each side thereof a surface coating formed of a composition consisting essentially of ethyl cellulose, paraffin and ethyl metatoluene sulphonamide in such relative proportions as to produce a transparent moistureproof coating.

20. A highly calendered paper containing a wetting agent distributed throughout its mass and impregnated with a composition consisting of 85.5% dewaxed shellac and 14.5% tricresyl phosphate, whereby the paper is transparentized, the transparentized paper having on each side thereof a transparent moistureproof surface coating formed of a composition consisting of 80% ethyl cellulose, 4% paraffin and 16% ethyl metatoluene sulphonamide, the percentages being by weight.

THERON G. FINZEL.
DONALD E. DREW.